Figure 1:
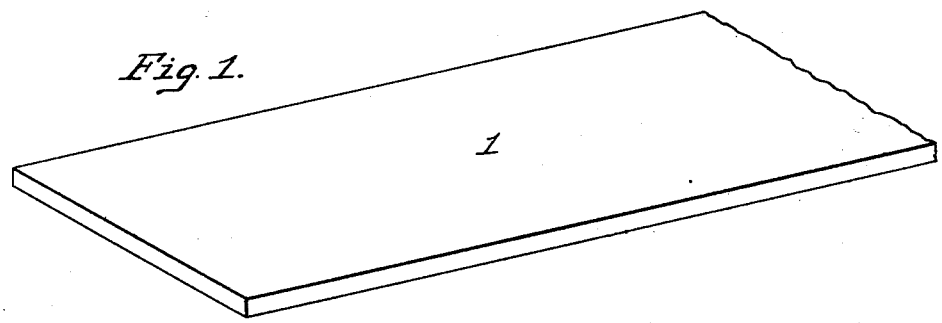

No. 653,911. Patented July 17, 1900.
D. HEGGIE.
METHOD OF FORMING RINGS AND COUPLINGS.
(Application filed Oct. 14, 1899.)
(No Model.) 2 Sheets—Sheet 1.

Witnesses: Inventor:
Walter Tamarian David Heggie
Harry G. Wiseman By Kay & Totten
Attorneys No. 653,911. Patented July 17, 1900.
D. HEGGIE.
METHOD OF FORMING RINGS AND COUPLINGS.
(Application filed Oct. 14, 1899.)

(No Model.) 2 Sheets—Sheet 2.

Witnesses:
Walter Famariss
Harry J. Wiseman

Inventor:
David Heggie
By Kay & Totten
Attorneys.

UNITED STATES PATENT OFFICE.

DAVID HEGGIE, OF McKEESPORT, PENNSYLVANIA, ASSIGNOR TO THE NATIONAL TUBE COMPANY, OF NEW YORK, N. Y., AND PITTSBURG, PENNSYLVANIA.

METHOD OF FORMING RINGS AND COUPLINGS.

SPECIFICATION forming part of Letters Patent No. 653,911, dated July 17, 1900.

Application filed October 14, 1899. Serial No. 733,595. (No model.)

*To all whom it may concern:*

Be it known that I, DAVID HEGGIE, a resident of McKeesport, in the county of Allegheny and State of Pennsylvania, have invented a new and useful Improvement in Methods of Forming Rings and Couplings; and I do hereby declare the following to be a full, clear, and exact description thereof.

My invention relates to the manufacture of rings and like articles, such as ordinary metal rings, bands, pipe-couplings, thread-protectors, &c. Its object is to reduce the cost of manufacture both by the employment of material in larger bulk or body relative to the articles formed and by the production of a number of articles at one welding operation. The usual custom in forming such rings or bands has been to roll the metal to approximately the desired width for a single article and then cut it into suitable lengths and to weld each article separately. This required a much greater reduction of the metal in order to bring it to the necessary section, and as such rolling was expensive the rolling of the bar itself was a matter of considerable expense in the production of such rings or couplings. Each ring or band was then welded separately, requiring separate heating and separate feeding to the machine, all of which increased the cost of the same still further.

The object of my invention is to provide for making such rings or bands or couplings a number at a time and to overcome the necessity of the great reduction of the metal relatively to the size of the coupling to be produced.

To these ends my invention consists, generally stated, in forming such rings or like articles by cutting a bar of width corresponding to the length of two or more of such rings into blanks of suitable length, heating the blanks and at one operation welding the same into tubular form, and shaping several rings from each blank, the rings being either left connected together, so that they can be separated by the threading of the inner faces thereof, such as in couplings for pipe-coilars, or being separated in connection with the welding operation. It also consists in certain other improvements, which will be more fully hereinafter set forth and claimed.

To enable others skilled in the art to make and use my invention, I will describe the same more fully, referring to the accompanying drawings, in which—

Figure 2:
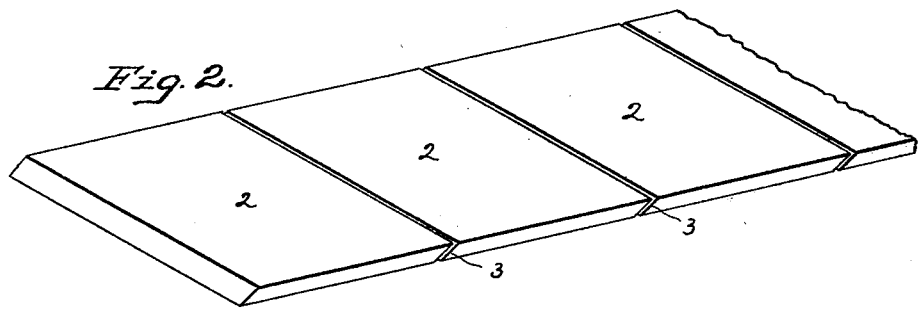
Figure 3:
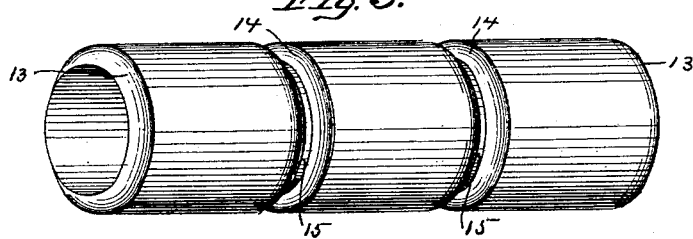
Figure 4:
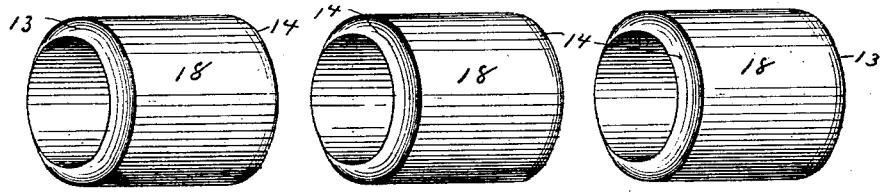
Figure 5:
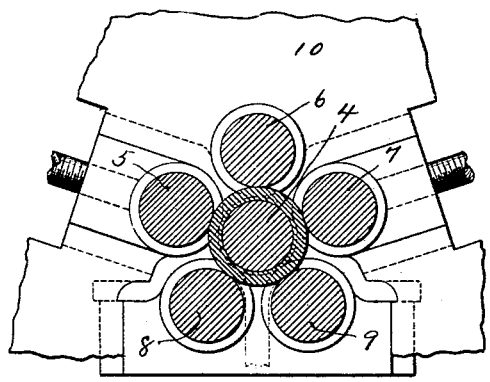
Figure 6:
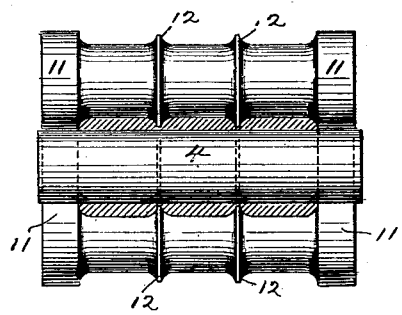
Figure 7:
Figure 8:
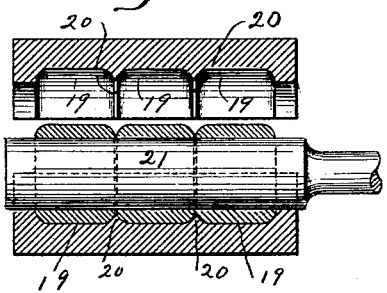
Figure 9:
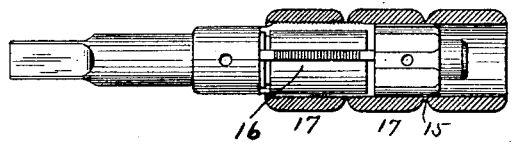

Figure 1 is a perspective view of a bar suitable for formation of two or more rings or like articles, such as pipe-couplings. Fig. 2 shows the same cut into length ready for welding. Fig. 3 is a like view of the finished welded series of rings or couplings where they are connected by thin webs. Fig. 4 shows the same when they are separated. Fig. 5 is a cross-section of a set of welding-rolls suitable for welding the blanks. Fig. 6 is a longitudinal vertical section showing the top roll in full lines, illustrating the rolls employed for the purpose. Fig. 7 shows the bar of Fig. 2 bent into skelp form ready for welding in hammer-dies, the drawing showing the blank partly broken away. Fig. 8 is a longitudinal section of a pair of hammer-dies, illustrating the forming of the article by swaging in such dies; and Fig. 9 is a longitudinal section illustrating the separation of the rings in the threading thereof.

Like figures of reference indicate like parts in each view.

My invention has been employed more particularly in forming such rings as pipe-couplings and pipe-thread protectors or collars, and the invention will be described in connection with the same. In the manufacture of such rings the custom has been to roll the bar down to the width of a single ring and then shear the same into blanks and weld them up separately. Instead of this I roll the bar, for example, of a width suitable for three rings, as shown at 1, Fig. 1. Figs. 1 and 2 are not made on any particular scale with reference to the other figures, but are simply illustrative. The cost of producing a bar of such width is much less than the cost of producing the narrower bars, while all the other operations in the formation of the rings or couplings are reduced in proportion to the number or rings or couplings produced, a very material saving in the cost of production being thus made. For example, such bar 1, having the width for three couplings, is by one operation sheared into blanks of the proper length for welding, as shown at 2, Fig. 2, the ends of the bars being preferably scarfed, as at 3, to provide for forming a lap-weld. Where these couplings are welded in rolls, as shown in Figs. 5 and 6, it is only necessary to heat the blanks in any suitable furnace and feed the blanks to the rolls, where they are welded and finished, no previous bending being required. The rolls employed fit around a mandrel 4, corresponding to the internal diameter of the coupling, there being three upper rolls 5, 6, and 7 and two lower rolls 8 9, and the upper and lower rolls being vertically adjustable with relation to each other, so that after the formation of the blank the rolls may be parted so as to permit of its withdrawal therefrom. The rolls are mounted in suitable housings 10, which provide for such operation. As shown in the drawings, each roll has formed thereon the end collars 11, and between the same and intermediate of their working faces, and, in fact, forming part of their working faces, the projecting rings 12, one or more, according to the number of couplings or rings to be formed at the single operation. The inner faces of the collars 11 and the side faces of the projecting rings 12 are formed curved or inclined, according to the desired incline or edge finish for the coupling. The projecting rings 12 are preferably brought to rather a thin edge, so that they will easily be forced into the body of metal, recessing it at such point, so as to round up or form the end faces of the couplings—for example, in the welded blank, Figs. 3 and 4, the end faces 13 at the ends of the blank and the like faces 14 intermediate of the ends, according to the number of couplings to be produced. The projecting rings 12 may be of a suitable height either to cut entirely through the bar in the rolling operation, the rolls contacting as the blank is finished with the mandrel 4, or to leave a thin web 15 between the couplings as they are welded, this thin web binding the series of couplings together. It is preferred to follow the latter course in making couplings and thread-protectors, because such thin webs hold the series of couplings together and they can be fed to the threading-dies, as shown in Fig. 9, requiring only the single feeding operation for the series of couplings, and in the threading operation the threading-tap 16, forming the inner threaded faces of the couplings, cut through such thin web 15 and separate the blank into several couplings or collars 17. In such threading operation the ordinary threading-tap may be employed, and I have only illustrated the same diagrammatically to show this step of the operation. Fig. 4 shows the several couplings 18, where they are separated during the welding operation above referred to.

Where the invention is practiced with hammer-dies, the usual hammer-dies are employed, except that their inner concave faces 19 are provided with projections 20, which serve to shape and finish the end faces of the couplings as the blanks are hammered and welded over the mandrels 21. In such case it is necessary to bend the blank, such as that shown in Fig. 2, into skelp form, as shown at 22 in Fig. 7, after which it is heated in a suitable furnace and placed over the mandrel 21 and welded so as to form two or more couplings at a single operation, this practice differing from that above described only in the fact that the couplings are welded by hammering instead of by a rolling process.

What I claim as my invention, and desire to secure by Letters Patent, is—

1. The method of forming rings or like articles, consisting in heating a bar of width corresponding to the length of two or more rings, and at one operation welding the same into tubular form and shaping the bodies of several rings therefrom.

2. The method of forming rings or like articles, consisting in heating a bar of width corresponding to the length of two or more rings, and at one operation welding the same into tubular form and shaping the bodies of several rings therefrom, and forming thin web connections between the several rings.

3. The method of forming rings or like articles, consisting in heating a bar of width corresponding to the length of two or more rings, and at one operation welding the same into tubular form and shaping the bodies of several rings therefrom and forming thin web connections between the several rings, and subsequently threading the blank so produced and thereby cutting away the web portions and separating the several rings, substantially as set forth.

In testimony whereof I, the said DAVID HEGGIE, have hereunto set my hand.

DAVID HEGGIE.

Witnesses:
A. Z. NEWLIN,
RICHARD JAMES.